(12) United States Patent
Adachi et al.

(10) Patent No.: US 11,067,175 B2
(45) Date of Patent: *Jul. 20, 2021

(54) GASKET-MOUNTING STRUCTURE

(71) Applicant: NIPPON PILLAR PACKING CO., LTD., Osaka (JP)

(72) Inventors: Tomohiro Adachi, Osaka (JP); Atsushi Nakano, Osaka (JP); Tomoyuki Koike, Osaka (JP); Kazukiyo Teshima, Osaka (JP); Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 78 days.

This patent is subject to a terminal disclaimer.

(21) Appl. No.: 16/424,663

(22) Filed: May 29, 2019

(65) Prior Publication Data
US 2019/0390773 A1 Dec. 26, 2019

(30) Foreign Application Priority Data
Jun. 21, 2018 (JP) .............................. JP2018-118028

(51) Int. Cl.
| F16J 15/02 | (2006.01) |
| F16J 15/06 | (2006.01) |
| F16L 17/073 | (2006.01) |
| F16L 23/22 | (2006.01) |
| F16L 23/18 | (2006.01) |
| F16J 15/10 | (2006.01) |

(52) U.S. Cl.
CPC ........... *F16J 15/025* (2013.01); *F16J 15/062* (2013.01); *F16L 17/073* (2013.01); *F16J 15/061* (2013.01); *F16J 15/104* (2013.01); *F16L 23/18* (2013.01); *F16L 23/22* (2013.01)

(58) Field of Classification Search
CPC ........ F16J 15/022; F16J 15/025; F16J 15/061; F16J 15/062; F16J 15/104; F16L 23/20; F16L 23/22; F16L 17/067; F16L 17/073; F16L 23/18
See application file for complete search history.

(56) References Cited

U.S. PATENT DOCUMENTS

| 1,873,855 | A | * | 8/1932 | Wilson | F16L 23/20 277/614 |
| 3,141,685 | A | * | 7/1964 | Watts | F16L 23/167 285/93 |
| 5,431,417 | A | * | 7/1995 | Dahlgren | F16L 23/20 277/614 |

(Continued)

FOREIGN PATENT DOCUMENTS

JP 2006-153180 6/2006
JP 2006349187 A * 12/2006

*Primary Examiner* — Nicholas L Foster
(74) *Attorney, Agent, or Firm* — Oblon, McClelland, Maier & Neustadt, L.L.P.

(57) ABSTRACT

A structure allowing a gasket to be mounted on a fluid device is provided. The gasket includes a ring with a first annular slope at a first axial end. The fluid device includes an inner sleeve with a second annular slope and an outer sleeve radially outside the inner sleeve. An outer periphery of the ring includes an annular contact face that contacts the outer sleeve and an annular non-contact face radially separated from the outer sleeve. The first annular slope contacts an outer periphery of the second slope.

5 Claims, 5 Drawing Sheets

(56) References Cited

U.S. PATENT DOCUMENTS

| | | | | |
|---|---|---|---|---|
| 5,433,454 A * | 7/1995 | Ramberg | | F16J 15/062 |
| | | | | 277/614 |
| 5,620,187 A * | 4/1997 | Jia | | F16L 25/0072 |
| | | | | 277/614 |
| 5,628,517 A * | 5/1997 | Jia | | F16L 25/0072 |
| | | | | 277/314 |
| 7,581,764 B2 * | 9/2009 | Ishihara | | F16J 15/062 |
| | | | | 285/331 |
| 8,033,579 B2 * | 10/2011 | Takeda | | F16L 23/06 |
| | | | | 285/367 |
| 8,613,557 B2 * | 12/2013 | Gruber | | F16J 15/3456 |
| | | | | 384/486 |
| 8,998,499 B2 * | 4/2015 | Gruber | | F16C 33/7836 |
| | | | | 384/486 |
| 9,045,961 B2 * | 6/2015 | Melancon | | F16L 23/20 |
| 10,400,923 B2 * | 9/2019 | Shirani | | E21B 17/04 |
| 10,415,729 B2 * | 9/2019 | Stobbart | | F16L 23/20 |
| 2001/0045709 A1 * | 11/2001 | Stobbart | | F16J 15/062 |
| | | | | 277/602 |
| 2005/0242519 A1 * | 11/2005 | Koleilat | | E21B 33/04 |
| | | | | 277/434 |
| 2006/0220326 A1 * | 10/2006 | Leadley-Brown | | F16J 15/062 |
| | | | | 277/609 |
| 2007/0262581 A1 * | 11/2007 | Ishihara | | F16K 27/003 |
| | | | | 285/10 |
| 2008/0000533 A1 * | 1/2008 | Katsura | | F16L 39/00 |
| | | | | 137/594 |
| 2009/0091125 A1 * | 4/2009 | Takeda | | B25B 27/10 |
| | | | | 285/88 |
| 2010/0013213 A1 * | 1/2010 | Katsura | | F16L 39/005 |
| | | | | 285/29 |
| 2010/0320699 A1 * | 12/2010 | Takeda | | F16L 23/22 |
| | | | | 277/612 |
| 2011/0249926 A1 * | 10/2011 | Gruber | | F16C 19/181 |
| | | | | 384/486 |
| 2011/0266797 A1 * | 11/2011 | Stobbart | | F16L 23/20 |
| | | | | 285/363 |
| 2014/0023303 A1 * | 1/2014 | Gruber | | F16C 33/767 |
| | | | | 384/486 |
| 2015/0176744 A1 * | 6/2015 | Glassman | | F16J 15/002 |
| | | | | 277/609 |
| 2017/0067583 A1 * | 3/2017 | Illakowicz | | F16J 15/0887 |
| 2019/0301608 A1 * | 10/2019 | Takeda | | F16L 47/065 |
| 2019/0368609 A1 * | 12/2019 | Adachi | | F16J 15/061 |
| 2019/0368611 A1 * | 12/2019 | Nakano | | F16J 15/104 |
| 2019/0390772 A1 * | 12/2019 | Nakano | | F16J 15/062 |
| 2020/0408305 A1 * | 12/2020 | Adachi | | F16J 15/062 |

\* cited by examiner

GASKET-MOUNTING STRUCTURE

TECHNICAL FIELD

The invention relates to gasket-mounting structures.

BACKGROUND ART

A gasket-mounting structure is known, which is disclosed in JP 2006-153180 A, for example. The structure allows a gasket to be mounted on a fluid device such as an integrated panel and to seal the gap between the gasket and the fluid device.

When the gasket is being mounted on the fluid device, an annular protrusion of the fluid device is press-inserted into an annular groove between inner and outer annular protrusions of the gasket to form a first sealing area between the annular protrusion of the fluid device and the groove of the gasket. While the fluid device has a reverse-tapered face at the outer periphery of the annular protrusion, the gasket has a tapered face at its inner periphery. The reverse-tapered face contacts the tapered face. The gasket-mounting structure allows the reverse-tapered face and the tapered face to be tightly pressed against each other when the gasket is being mounted on the fluid device. Thus, a second sealing area is provided between the reverse-tapered face and the tapered face.

SUMMARY OF THE INVENTION

Each conventional gasket-mounting structure makes the inner circumferential surface of the annular protrusion of the fluid device contact the inner circumferential surface of the annular groove of the gasket to form the first sealing area near a fluid channel. The annular protrusion presses the annular groove radially inward. Since the fluid channel is located radially inside the annular protrusion, the tapered face of the gasket presses the annular protrusion toward the fluid channel. Thus, there is a risk that the annular protrusion might be deformed toward the fluid channel. The deformed annular protrusion would narrow the fluid channel and increase the pressure loss of the fluid channel. The deformed annular protrusion would also cause a stagnation in the fluid channel and prevent smooth flow in the fluid channel.

To solve the above-described problems, the invention is provided. An object of the invention is to prevent the annular protrusion of the fluid device from being deformed toward the fluid channel.

According to an aspect of the invention, a structure allows a gasket to be mounted on a fluid device. The gasket includes a ring with a first annular slope at a first axial end. The fluid device includes an inner sleeve with a second annular slope and an outer sleeve radially outside the inner sleeve. An outer periphery of the ring includes an annular contact face that contacts the outer sleeve and an annular non-contact face radially separated from the outer sleeve. The first annular slope contacts an outer periphery of the second annular slope.

DESCRIPTION OF THE EMBODIMENTS

Figure 1:
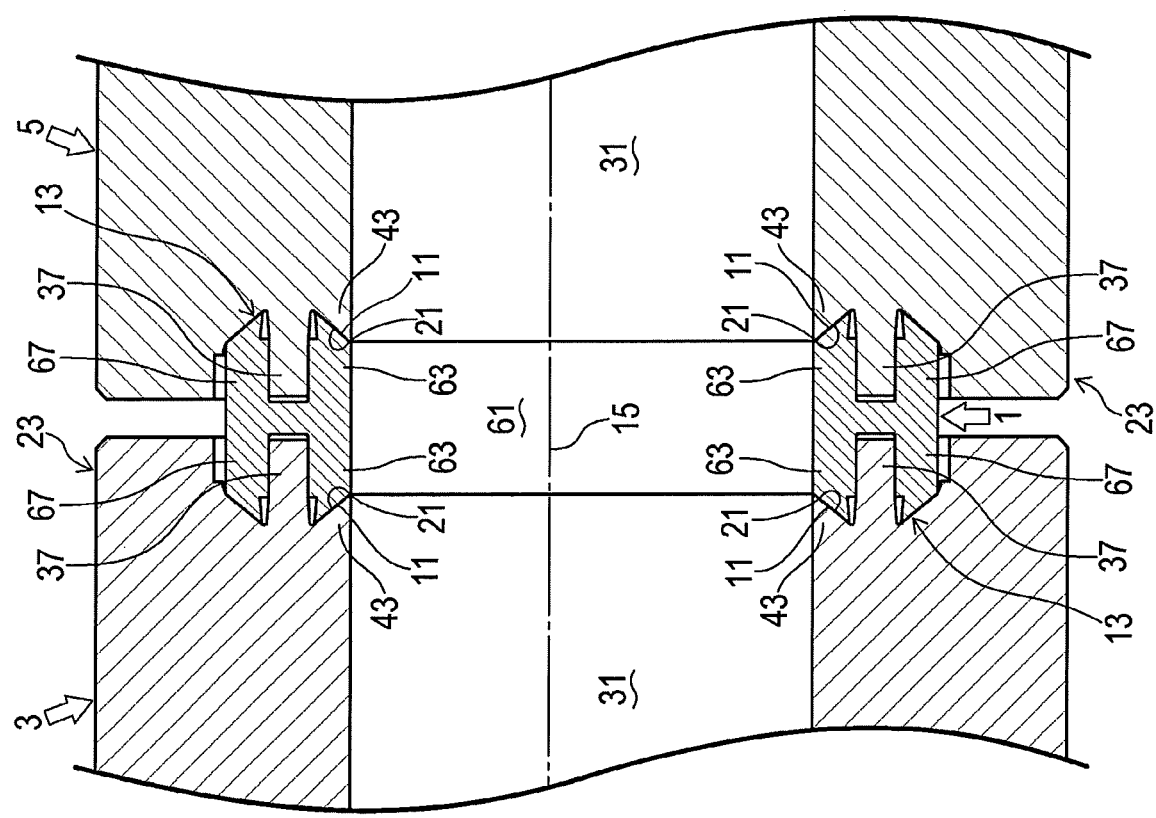
FIG. 1 is a cross-section view of a gasket-mounting structure according to an embodiment of the invention.
Figure 2:
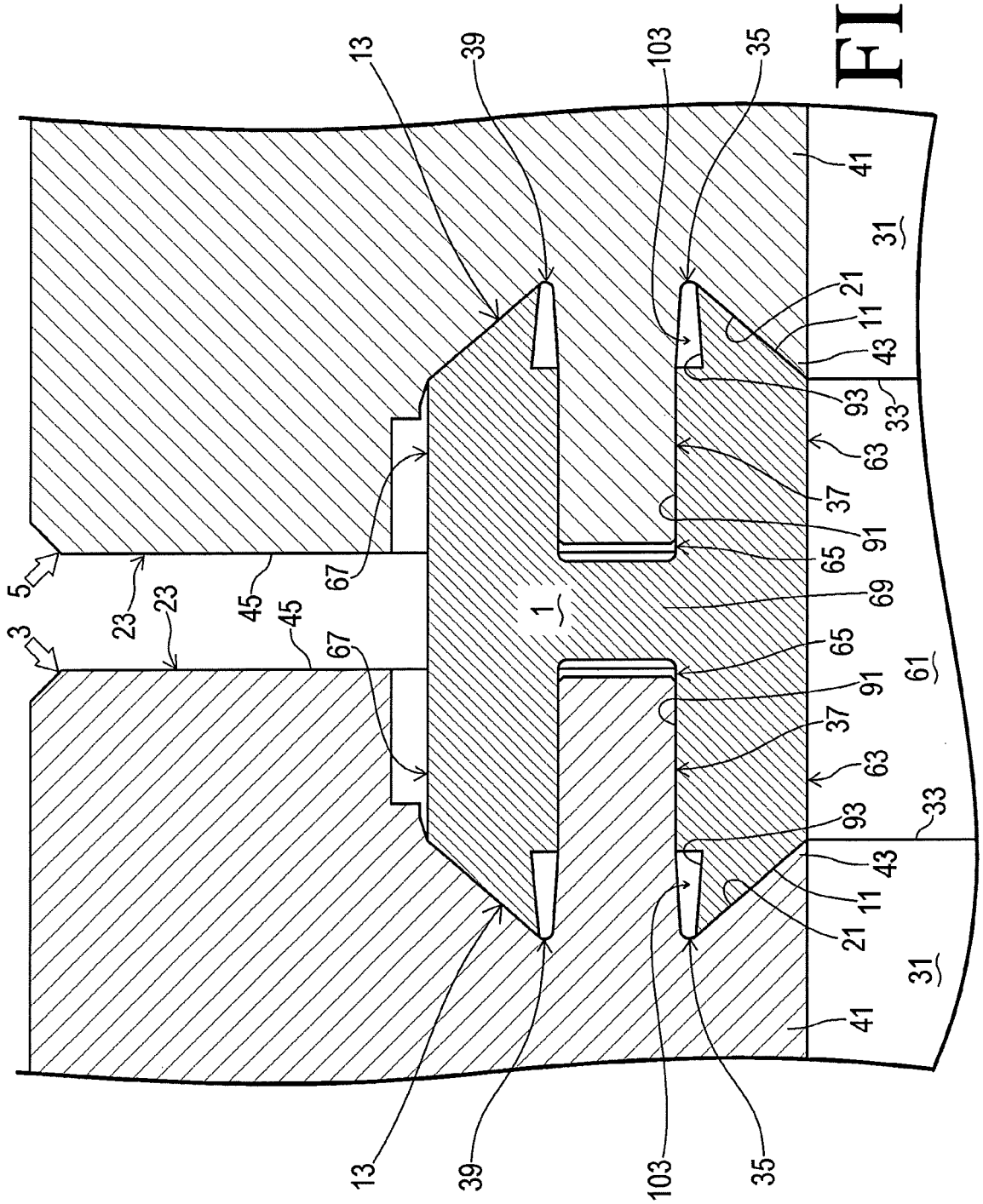
FIG. 2 is a partially enlarged cross-section view of the gasket-mounting structure of FIG. 1.
Figure 3:
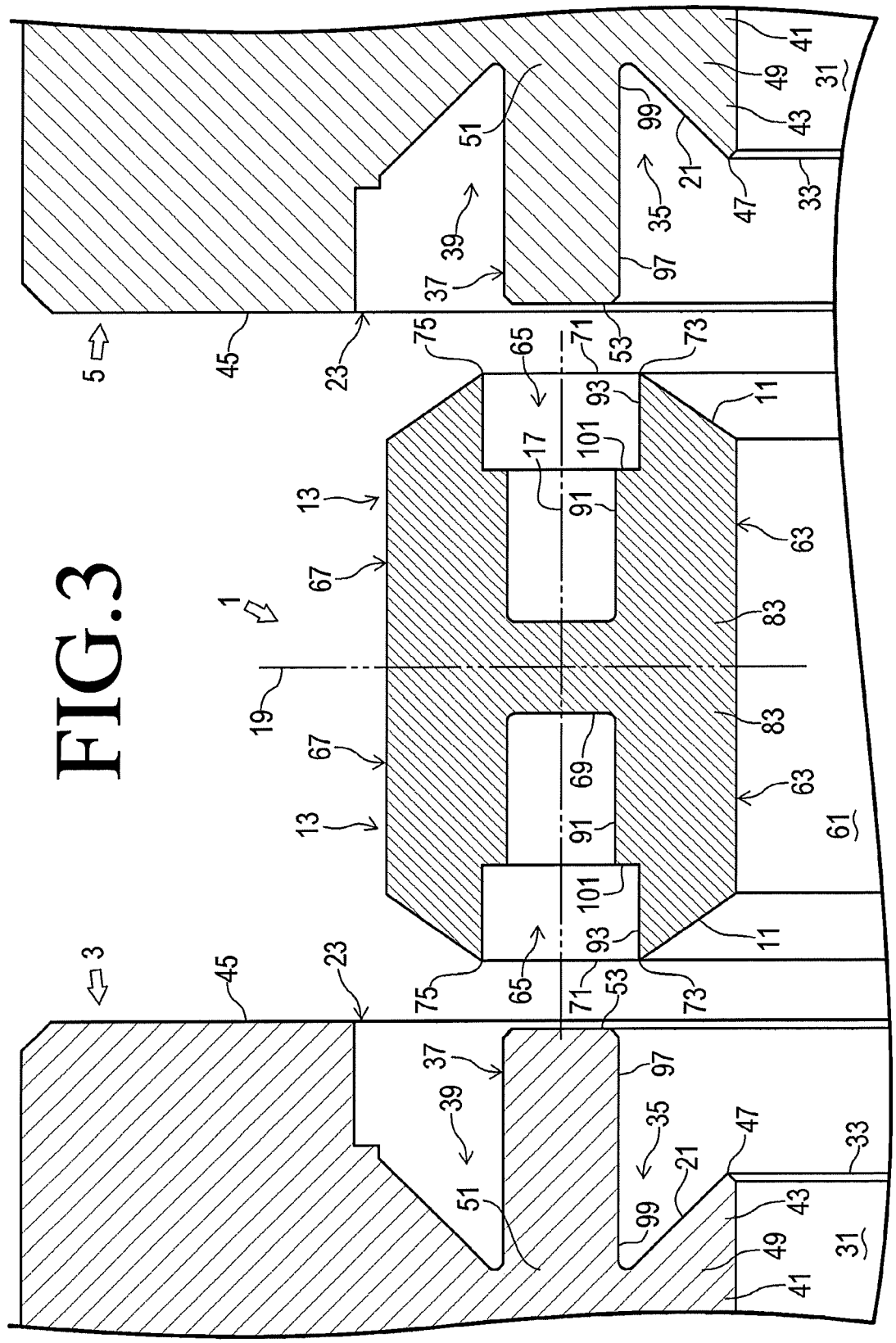
FIG. 3 is an exploded view of the gasket-mounting structure of FIG. 2.

As shown in FIGS. 1-3, a gasket-mounting structure according to an embodiment of the invention is used to mount a gasket 1 on a first fluid device 3. The structure is also used to mount the gasket 1 on a second fluid device 5. The structure connects the first fluid device 3 to the second fluid device 5. One of the fluid devices 3 and 5 is located at an upper portion of the flow of fluid, and the other is at a lower portion of the flow. The gasket 1 is placed between the fluid devices 3 and 5. Note that the fluid devices 3 and 5 are devices relating to fluid that include, but are not limited to, integrated panels, valves, pumps, accumulators, fluid reservoirs, heat exchangers, regulators, pressure gauges, flowmeters, heaters, and flange pipes.

The gasket 1 has an annular body with a constant inner diameter. The gasket 1 includes an attaching portion 13 at a first axial end and another attaching portion 13 at a second axial end. The attaching portions 13 each include an inner protrusion 63, an annular groove 65, and an outer protrusion 67. The inner protrusion 63 is a ring with a first annular slope 11 at a first axial end. The outer protrusion 67 is another ring radially outside the inner protrusion 63. The groove 65 is defined by the inner protrusion 63 and the outer protrusion 67.

As shown in FIG. 1, a cross section of the gasket 1 that includes an axis 15 of the gasket 1 is symmetric with respect to the axis 15. The annular body of the gasket 1 defines the hole of the gasket 1 and has an H-shaped cross section, on which the shapes of the attaching portions 13 are based. As shown in FIG. 3, the H-shaped cross section is symmetric with respect to a first virtual line 17 parallel to the axis 15 of the gasket 1 and passing through the radial center of the H-shaped cross section. The H-shaped cross section is also symmetric with respect to a second virtual line 19 perpendicular with the first virtual line 17.

The first fluid device 3 includes an attached portion 23, on which one of the attaching portions 13 of the gasket 1 is mounted. The second fluid device 5 includes another attached portion 23, on which the other of the attaching portions 13 of the gasket 1 is mounted. The attached portions 23 each have an annular protrusion 43 and an annular convex 37. The protrusion 43 is an inner sleeve with a second annular slope 21 that contacts the first annular slope 11. The convex 37 is an outer sleeve located radially outside the inner sleeve. The attached portion 23 of the first fluid device 3 is located on a side of the attached portion 23 of the second fluid device 5. The attached portions 23 are adjacent to each other and arranged coaxially to face each other across the gasket 1.

The structure allowing a first axial side (the left side in FIG. 1) of the gasket 1 to be mounted on the first fluid device 3 is equivalent to the structure allowing a second axial side (the right side in FIG. 1) of the gasket 1 to be mounted on the second fluid device 5. Thus, the following will mainly explain the structure at the first fluid device 3.

The attached portion 23 of the first fluid device 3 is placed at the second axial end of the first fluid device 3, its right end in FIG. 1. The attached portion 23 encloses a first fluid channel 31, which has a circular cross section and extends along the axis 15 of the gasket 1 mounted on the first fluid device 3, i.e. in a horizontal direction in FIG. 1. The first fluid channel 31 is a hole, i.e. an inner space, of the annular attached portion 23. The first fluid channel 31 is open towards the gasket 1, rightward in FIG. 1. As shown in FIG. 2, the opening 33 of the first fluid channel 31 is placed axially inside (i.e. on the left of) the (right) end face 45 of the attached portion 23.

The attached portion 23 is made from certain thermoplastic resin, which includes, for example, fluoropolymer such as perfluoroalkoxy alkane (PFA) and polytetrafluoroethylene (PTFE). Alternatively, the fluoropolymer may be polychlorotrifluoroethylene (PCTFE) or ethylene-tetrafluoroethylene copolymer (ETFE). As usage, the attached portion 23 may be made from polypropylene (PP), high-density polyethylene (HDPE), low-density polyethylene (LDPE), or polyoxymethylene (POM).

In addition to the convex 37, the attached portion 23 includes an annular inner concave 35 and an annular outer concave 39. The opening 33 of the first fluid channel 31 is surrounded by the inner concave 35, which is surrounded by the convex 37, which is surrounded by the outer concave 39. The inner concave 35, the convex 37, and the outer concave 39 extend in the axial direction (a horizontal direction in FIG. 2), along which the gasket 1 approaches the first fluid device 3 when the gasket 1 is being mounted on the first fluid device 3. The inner concave 35, the convex 37, and the outer concave 39 are coaxial with each other and the first fluid channel 31. The inner concave 35, the convex 37, and the outer concave 39 contact the attaching portion 13 of the gasket 1 when the gasket 1 is mounted on the first fluid device 3.

The inner concave 35 has a shape that fits the inner protrusion 63 of the gasket 1. The inner concave 35 is open toward the gasket 1 (rightward in FIG. 2) and extends around the opening 33 of the first fluid channel 31 in a circumferential direction of the attached portion 23.

The convex 37 has a shape that fits the groove 65 of the gasket 1. The convex 37 protrudes from the body 41 of the first fluid device 3 toward the gasket 1 (rightward in FIG. 2) and extends around the inner concave 35 in a circumferential direction of the attached portion 23.

The outer concave 39 has a shape that fits the outer protrusion 67 of the gasket 1. The outer concave 39 is open toward the gasket 1 (rightward in FIG. 2) and extends around the convex 37 in a circumferential direction of the attached portion 23.

The annular protrusion 43, together with the convex 37, defines the inner concave 35. The shape of the protrusion 43 reduces a cross-section area of the inner concave 35 with increase in distance from the opening of the inner concave 35. In a radial direction of the attached portion 23, the protrusion 43 is located between the opening 33 of the first fluid channel 31 and the convex 37. The protrusion 43 extends from the body 41 of the first fluid device 3 toward the gasket 1 (rightward in FIG. 2). The protrusion 43 extends not only in an axial direction of the attached portion 23 but also in a circumferential direction of it around the opening 33 of the first fluid device 31. The protrusion 43 extends around the convex 37 in a circumferential direction of the attached portion 23. The protrusion 43 has an annular shape with a constant inner diameter and tapers toward an (right) end face 45 of the attached portion 23. An outer periphery of the protrusion 43 has the second annular slope 21. An inner periphery of the protrusion 43 faces the first fluid channel 31.

The second annular slope 21 has a first portion near the tip end 47 (right end in FIG. 3) of the protrusion 43 and a second portion near the base (left) end 49 of it. The first portion is located at a distance from the convex 37 in a radial direction of the attached portion 23. The second portion is connected to the base end 51 of the convex 37. The first portion is located radially inside the second portion. The second annular slope 21 is inclined so that its parts at larger distances from the tip end 47 have larger diameters.

The inner concave 35 and the outer concave 39 are symmetric with respect to the convex 37. Like the inner concave 35 defined by the convex 37 and the second annular slope 21, the outer concave 39 is defined by the convex 37 and another second annular slope 21.

The convex 37 is located on the left of the (right) end face 45 of the attached portion 23. To be exact, the tip end 53 of the convex 37 is located, in an axial direction of the attached portion 23, nearer to the body 41 of the first fluid device 3 (leftward) than the end face 45 of the attached portion 23.

The (attaching portion 13 of the) gasket 1 is made from certain thermoplastic resin, which includes, for example, fluoropolymer such as PFA and PTFE. Alternatively, the fluoropolymer may be PCTFE or ETFE. As usage, the gasket 1 may be made from PP, HDPE, LDPE, or POM.

The gasket 1 includes a second fluid channel 61, which is a through hole in an axial direction of the gasket 1. The second fluid channel 61 has a circular cross section perpendicular to the axial direction and extends in the axial direction (a horizontal direction in FIG. 1). The second fluid channel 61 has a constant diameter, which corresponds to the inner diameter of the gasket 1 and equals the diameter of the first fluid channel 31, which corresponds to the inner diameter of the attached portion 23. The second fluid channel 61 is coaxial with the first fluid channel 31. The second fluid channel 61 is open toward the first fluid device 3 (leftward in FIG. 1) at the first axial end (the left end in FIG. 1) of (the attaching portion 13 of) the gasket 1. Through the opening, the second fluid channel 61 is connected to the first fluid channel 31.

The second fluid channel 61 is surrounded by the inner protrusion 63, which is surrounded by the groove 65, which is surrounded by the outer protrusion 67. The inner protrusion 63, the groove 65, and the outer protrusion 67 extend in an axial direction of the gasket 1 (a horizontal direction in FIG. 1). The inner protrusion 63, the groove 65, and the outer protrusion 67 are coaxial with each other and the second fluid channel 61.

The inner protrusion 63 has a shape that fits the inner concave 35 of the first fluid device 3. The inner protrusion 63 protrudes from the axial center 69 of the gasket 1 toward the first axial direction (leftward in FIG. 2) and extends around the second fluid channel 61 in a circumferential direction of the attaching portion 13.

The groove 65 has a shape that fits the convex 37 of the first fluid device 3. The groove 65 is open toward the first axial direction of the gasket 1 (leftward in FIG. 2) and extends around the inner protrusion 63 in a circumferential direction of the attaching portion 13. The groove 65 is defined by the inner protrusion 63, the outer protrusion 67, and the axial center 69 of the gasket 1. The opening 71 of the groove 65 is located at the same axial position as the tip end 73 of the inner protrusion 63 and the tip end 75 of the outer protrusion 67.

The outer protrusion 67 has a shape that fits the outer concave 39 of the first fluid device 3. The outer protrusion 67 protrudes from the axial center 69 of the gasket 1 toward the first axial direction (leftward in FIG. 2) and extends around the groove 65 in a circumferential direction of the attaching portion 13.

Figure 4:
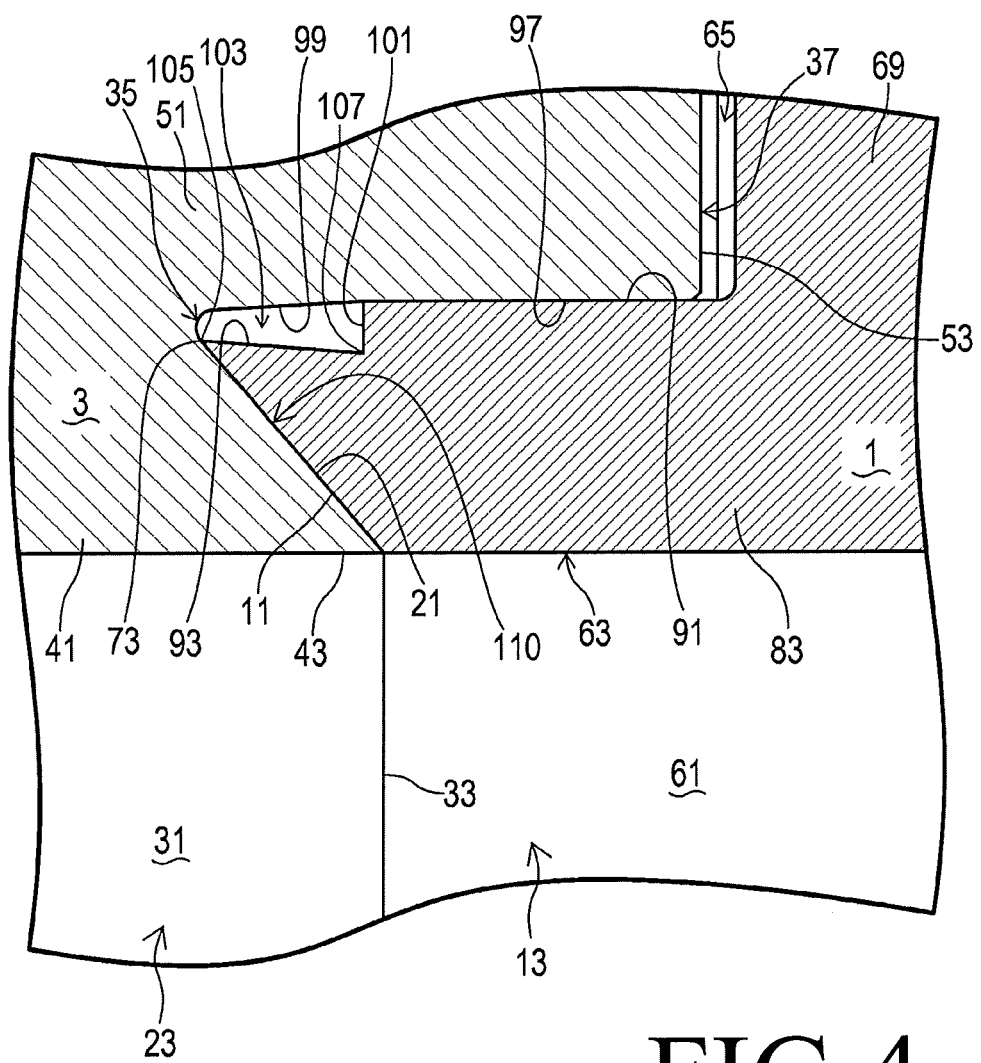
FIG. 4 is a partially enlarged view of FIG. 2.

The inner protrusion 63 has a portion near the tip end 73, i.e. a left portion in FIG. 4. The portion tapers toward the tip end 73. An inner periphery of the portion has the first annular slope 11. An outer periphery of the portion faces the groove 65.

The first annular slope 11 has a shape inclined with respect to the axis 15 of the gasket 1 so that the first annular slope 11 can contact the whole periphery of the second annular slope 21 inclined with respect to the axis of the attached portion 23. Note that the axis of the attached portion 23 and the axis 15 of (the attaching portion 13 of) the gasket 1 are colinear with each other. The first annular slope 11 presses the second annular slope 21 from its radial outside to seal the gap between the slopes 11 and 21. A portion of the inner protrusion 63 with the first annular slope 11 has a shape to contact and press the convex 37 from its radial inside.

The shape will be described in more detail. The first annular slope 11 is inclined so that the portion of the inner protrusion 63 near its tip end 73, i.e. its left portion in FIG. 3, is located radially outside the portion of the inner protrusion 63 near its base end 83, i.e. its right portion in FIG. 3; parts of the first annular slope 11 nearer to the tip end 73 are located at larger radiuses. In the portion of the inner protrusion 63 near its tip end 73, i.e. its left portion, parts nearer to the tip end 73 have larger inner diameter. The first annular slope 11 extends throughout the whole circumference of the inner periphery of the gasket 1 to fit the second annular slope 21, which extends throughout the whole circumference of the outer periphery of the protrusion 43. The gradient of the first annular slope 11 with respect to the axis 15 of the gasket 1 is equal to that of the second annular slope 21 with respect to the axis of the attached portion 23.

Since the groove 65 has a radial width slightly narrower than that of the convex 37, the convex 37 is pressed against the groove 65 when it is inserted into the groove 65. The convex 37 is tightly attached to a part of the inner periphery of the groove 65 (a part of the outer periphery of the inner protrusion 63) radially inside the convex 37. As shown in FIG. 4, radially inside the convex 37, the inner protrusion 63 has an annular contact face 91 and an annular non-contact face 93. The contact face 91 contacts the convex 37, and the non-contact face 93 is radially separated from the convex 37.

The contact face 91 is located near the base end 83 of the inner protrusion 63 in its outer periphery. The contact face 91 extends around the inner circumferential surface 97 of the convex 37 near its tip end 53 throughout the whole circumference of the inner protrusion 63. When the convex 37 is pressed into a space between the inner protrusion 63 and the outer protrusion 67 (i.e. into the groove 65), the contact face 91 contacts the inner circumferential surface 97 of the convex 37 near its tip end 53 to form a first sealing area, in which a radial sealing force is exerted between the convex 37 and the inner protrusion 63.

The non-contact face 93 is located near the tip end 73 of the inner protrusion 63 in its outer periphery. Note that the non-contact surface 93 only has to be located at a single area in the axial direction of the inner protrusion 63, as shown in FIG. 4. The non-contact face 93 extends throughout the whole circumference of the inner protrusion 63 and faces the inner circumferential surface 99 of the convex 37 near its tip end 53. The non-contact face 93 is then at a radial distance from the inner circumferential surface 99. The non-contact face 93 is partitioned by a step 101 from the contact face 91. The non-contact face 93 is radially inside the contact face 91. In other words, the non-contact face 93 has a smaller outer diameter than the contact face 91.

When the convex 37 is placed in the groove 65, the contact face 91 contacts the inner circumferential surface 97 of the convex 37 near its tip end 53, and the non-contact face 93 forms an annular space 103 between the non-contact face 93 and the inner circumferential surface 99 of the convex 37 near its base end 51.

When the gasket 1 is mounted on the first fluid device 3, the non-contact face 93 is inclined with respect to the axis of the inner protrusion 63, i.e. the axis 15 of the gasket 1, as shown in FIG. 4. Thus, the area 105 on the non-contact face 93 near the tip end 73 of the inner protrusion 63 is located radially outside the area 107 on the non-contact face 93 near the base end 83 of the inner protrusion 63. Areas on the non-contact face 93 nearer to the tip end 73 are located at larger radiuses. In a portion of the inner protrusion 63 with the non-contact face 93, parts nearer to the tip end 73 have larger outer diameters. Note that the non-contact face 93 may have a gradient inverse to that in the embodiment or may be parallel to the axis 15 of the gasket 1.

Since the inner protrusion 63 and the outer protrusion 67 are symmetric with respect to the groove 65, i.e. the outer protrusion 67 is symmetric with respect to the first virtual line 17, as shown in FIG. 3, the outer protrusion 67 forms a sealing area, like the inner protrusion 63.

When the gasket 1 is being mounted on the first fluid device 3, i.e. it is being changed from the position separated from the first fluid device 3 (cf. FIG. 3) to the position mounted on it (cf. FIG. 2), the attaching portion 13 on the first axial (left) side of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Next, a coupling means not shown in the figures couples the first fluid device 3 with the second fluid device 5. The fluid devices 3 and 5 are tightly pulled toward each other and squeezed.

The coupling means includes, but is not limited to, a hole, a nut, and a bolt. The hole is opened at one of the first fluid device 3 and the second fluid device 5. The nut is attached to the other of the fluid devices 3 and 5. The bolt passes through the hole and is screwed into the nut.

Continuing to squeeze the fluid devices 3 and 5, the coupling means presses the first annular slope 11 against the second annular slope 21, as shown in FIG. 4. The inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23.

When the gasket 1 is completely mounted on the fluid devices 3 and 5, the first annular slope 11 and the second annular slope 21 form a first sealing area in which a sealing force acts in an axial direction, and the convex 37 and the inner protrusion 63 form a second sealing area in which a sealing force acts in a radial direction. In the second sealing area, the contact face 91 of the inner protrusion 63 tightly contacts the inner circumferential surface 97 of the convex 37 near the tip end 53, while the non-contact face 93 of the inner protrusion 63 is separated from the inner circumferential surface 99 of the convex 37 near the base end 51 across the annular space 103. While the contact face 91 of the inner protrusion 63 seals the gap between the contact face 91 and the inner circumferential surface 97 of the convex 37 near the tip end 53, the non-contact face 93 of the inner protrusion 63 is kept separate from the convex 37. This reduces pressure that the convex 37 exerts against the inner protrusion 63, thus decreasing pressure that the inner protrusion 63 exerts against the protrusion 43.

Therefore, the convex 37 is prevented from pressing the inner protrusion 63 radially inward, and the first annular slope 11 of the inner protrusion 63 is prevented from pressing the second annular slope 21 and the protrusion 43 of the first fluid device 3 radially inward. As a result, the protrusion 43 cannot be deformed toward the first fluid channel 31. The protrusion 43 is prevented from narrowing the first fluid channel 31. This prevents pressure loss caused by the deformation of the first fluid channel 31. This also prevents stagnation in the first fluid channel 31, and thus, ensures smooth flow therein.

Since the contact face 91 is near the base end 83 of the inner protrusion 63 and the non-contact face 93 is near the tip end 73 of it, pressure that the convex 37 exerts against the inner protrusion 63 radially inward is effectively reduced around the first annular slope 11. This facilitates preventing the protrusion 43 from being deformed radially inward when the first annular slope 11 presses the second annular slope 21.

Figure 5:
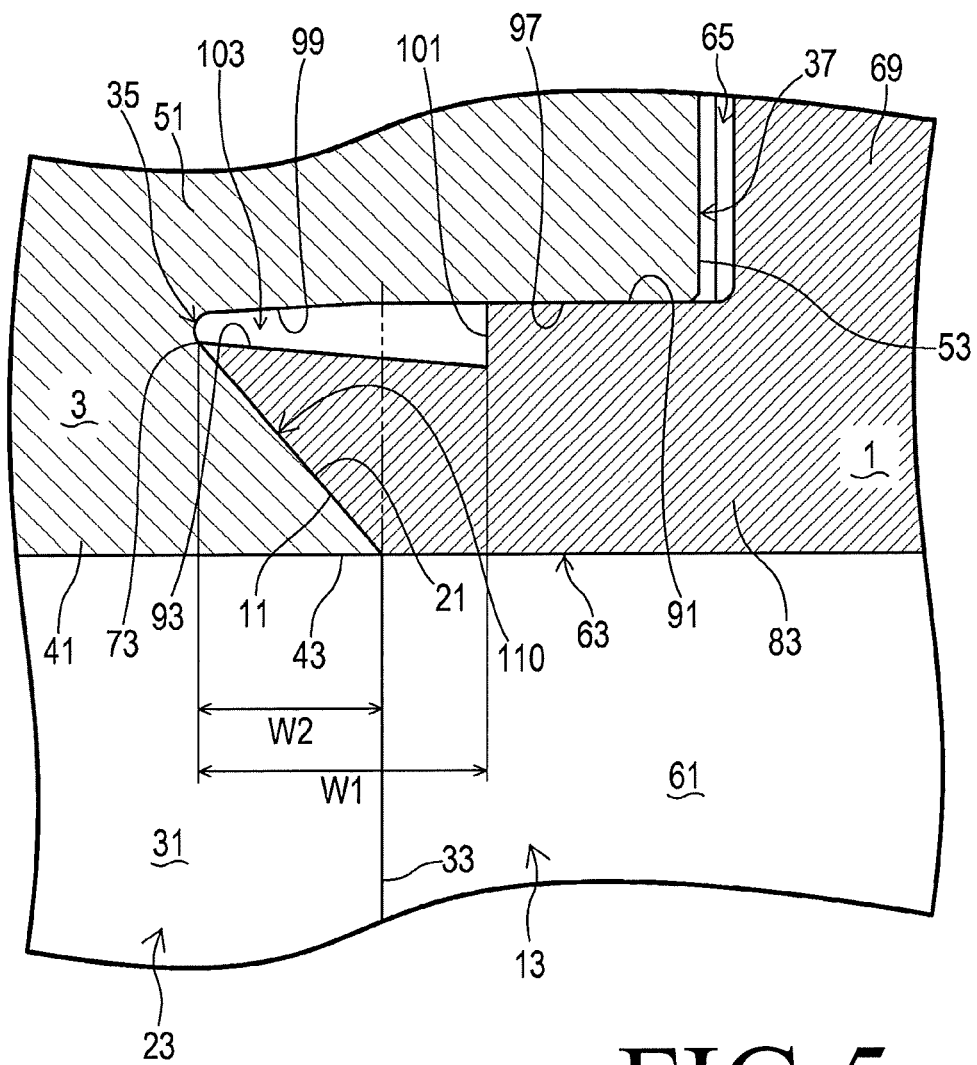
FIG. 5 shows a gasket-mounting structure of another embodiment of the invention when a gasket completely contacts a fluid device.

As shown in FIG. 4, the non-contact face 93 extends from the first axial end (the tip end 73) of the inner protrusion 63 toward the second axial end (the base end 83) of it within the axial range of the area 110 in which the first annular slope 11 contacts the second annular slope 21. However, this is not a unique case. As shown in FIG. 5, the non-contact face 93 may axially extend nearer to the second axial end of the inner protrusion 63 than the area 110. Preferably, when the non-contact face 93 has a first axial width W1 and the area 110 has a second axial width W2, the first axial width W1 should be equal to or larger than the second one W2: W1≥W2. The first axial width W1 may be appropriately designed to secure the contact face 91 in the inner protrusion 63. When the condition W1≥W2 is satisfied, the convex 37 effectively reduces radially inward pressure against the inner protrusion 63. This facilitates preventing the protrusion 43 from being deformed radially inward.

The above-described explanation teaches that the invention can obviously have variations and modifications. Accordingly, it should be understood that the invention can have embodiments other than those in the description within the scope of the claims attached to the description.

Supplement

The structure according to the invention can keep the non-contact face of the ring separate from the outer sleeve. This reduces pressure that the outer sleeve exerts against the ring, and thus reduces pressure that the ring exerts against the inner sleeve. Accordingly, when the ring is placed in the outer sleeve, the outer sleeve is prevented from pressing the ring radially inward, and thus, the first annular slope of the ring is prevented from pressing the second annular slope and the inner sleeve radially inward. As a result, the inner sleeve is prevented from being deformed toward a radial inside of the fluid channel. The inner sleeve is prevented from narrowing the fluid channel. This prevents pressure loss caused by the deformation of the fluid channel. This also prevents stagnation in the fluid channel, and thus, ensures smooth flow therein.

Based on the above-described embodiments, the invention may be further characterized as follows: The contact face may be located near a second axial end of the ring, and the non-contact face may be located near the first axial end of the ring. This effectively reduces radially inward pressure that the outer sleeve exerts against the ring, esp. near the first annular slope. Thus, the protrusion is easily prevented from being deformed radially inward by the first annular slope pressing the second annular slope.

The non-contact face may extend, in an axial direction of the ring, nearer to the second axial end of the ring than the range in which the first annular slope contacts the second annular slope. This effectively reduces radially inward pressure that the outer sleeve exerts against the ring, esp. near the first annular slope. This thus facilitates preventing the protrusion from being deformed radially inward by the first annular slope pressing the second annular slope.

The non-contact face may be inclined to the axis of the ring.

What is claimed is:

1. A structure allowing a gasket to be mounted on a fluid device, comprising:
   the gasket including a ring with a first annular slope at a first axial end; and
   the fluid device including an inner sleeve with a second annular slope and an outer sleeve radially outside the inner sleeve, wherein
   an outer periphery of the ring includes an annular contact face that contacts the outer sleeve and an annular non-contact face radially separated from the outer sleeve,
   the first annular slope contacts an outer periphery of the second annular slope
   within a range in an axial direction of the ring in which the first annular slope contacts the second annular slope, the non-contact face extends from the first axial end of the ring toward a second axial end of the ring, and
   an axial width of the non-contact face is configured such that, within the range, radially inward pressure of the outer sleeve against the ring is reduced and radially inward pressure of the ring is prevented from deforming the inner sleeve.

2. The structure according to claim 1, wherein:
   the contact face is located near the second axial end of the ring;
   the non-contact face is located near the first axial end of the ring.

3. The structure according to claim 2, wherein the non-contact face extends, in an axial direction of the ring, nearer to the second axial end of the ring than the range in which the first annular slope contacts the second annular slope.

4. The structure according to claim 2, wherein the non-contact face is inclined to an axis of the ring.

5. The structure according to claim 1, wherein the non-contact face has an axial width that exceeds the range in the axial direction of the ring in which the first annular slope contacts the second annular slope.

* * * * *